US012189590B1

(12) United States Patent
Fan et al.

(10) Patent No.: US 12,189,590 B1
(45) Date of Patent: Jan. 7, 2025

(54) SYSTEMS AND METHODS FOR QUERYING LARGE DATA REPOSITORIES

(71) Applicant: Recruit Co., Ltd., Tokyo (JP)

(72) Inventors: Grace Fan, Wayne, PA (US); Jin Wang, Cupertino, CA (US); Yuliang Li, Cupertino, CA (US); Dan Zhang, Sunnyvale, CA (US); Renée J. Miller, Boston, MA (US)

(73) Assignee: RECRUIT CO., LTD., Toyko (JP)

( * ) Notice: Subject to any disclaimer, the term of this patent is extended or adjusted under 35 U.S.C. 154(b) by 0 days.

(21) Appl. No.: 18/470,350

(22) Filed: Sep. 19, 2023

(51) Int. Cl.
*G06F 17/00* (2019.01)
*G06F 16/22* (2019.01)
*G06F 16/242* (2019.01)

(52) U.S. Cl.
CPC .......... *G06F 16/221* (2019.01); *G06F 16/243* (2019.01)

(58) Field of Classification Search
CPC .............................. G06F 16/221; G06F 16/243
See application file for complete search history.

(56) References Cited

U.S. PATENT DOCUMENTS

| | | | |
|---|---|---|---|
| 11,372,883 B2 * | 6/2022 | Seki ................... | G06F 12/00 |
| 11,429,579 B2 * | 8/2022 | Bordawekar ......... | G06F 16/243 |
| 11,608,474 B2 * | 3/2023 | Duvoisin .............. | C10G 33/02 |
| 2007/0239663 A1 * | 10/2007 | Dyskant ............ | G06F 16/24532 |
| 2020/0159848 A1 * | 5/2020 | Yeo ........................ | G06N 20/00 |

OTHER PUBLICATIONS

Michael Gunther et al., Pre-Trained Web Table Embeddings for Table Discovery. In Proceedings of the Fourth International Workshop on Exploiting Artificial Intelligence Techniques for Data Management. Association for Computing Machinery, <24-31. https://doi.org/10.1145/3464509.3464892>, Jun. 2021.*
Adelfio et al., "Schema Extraction for Tabular Data on the Web," on the Web. Proc. VLDB Endow. 6, 6 (2013), pp. 421-432.
Bogatu, et al., "Dataset Discovery in Data Lakes," School of Computer Science, University of Manchester, Manchester, UK, 2020 IEEE 36th International Conference on Data Engineering (ICDE). pp. 709-720.

(Continued)

*Primary Examiner* — Greta L Robinson
(74) *Attorney, Agent, or Firm* — Finnegan, Henderson, Farabow, Garrett & Dunner, LLP

(57) ABSTRACT

Disclosed embodiments relate to systems, methods, and computer readable storage media for performing dataset discovery. Some embodiments may include accessing a data repository having a plurality of tables having cell values arranged in one or more columns and one or more rows, generating serialized sequences of the cell values that correspond to particular columns of the plurality of tables, inputting the serialized sequences into a natural language model, converting, using the natural language model, the serialized sequences into contextualized embeddings associated with the plurality of tables, storing the contextualized embeddings associated with the plurality of tables in one or more vector indices, receiving a query table, or generating an output of one or more candidate tables from the plurality of tables that are unionable with the received query table.

20 Claims, 10 Drawing Sheets

(56) References Cited

OTHER PUBLICATIONS

Brickley, et al., "Google Dataset Search: Building a search engine for datasets in an open Web ecosystem," WWW'19, May 13-17, 2019, San Francisco, CA, USA 2019 IW3C2 (International World Wide Web Conference Committee), (11 pages).

Cafarella, et al., "Data Integration for the Relational Web," Proc. VLDB Endow. 2, 1 (2009), VLDB '09, Aug. 24-28, 2009, Lyon, France, pp. 1090-1101.

Cafarella, et al., "WebTables: Exploring the Power of Tables on the Web," PVLDB "08 Aug. 23-28, 2008, Auckland, New Zealand, (2008), pp. 538-549.

Cappuzzo, et al., "Creating Embeddings of Heterogeneous Relational Datasets for Data Integration Tasks," SIGMOD, '20, Jun. 14-19, 2020, Portland OR, USA, pp. 1335-1349.

Castelo, et al., "Auctus: A Dataset Search Engine for Data Discovery and Augmentation," VLDB Endowment, vol. 14, No. 12, 2021, pp. 2791-2794.

Charikar et al., "Similarity Estimation Techniques from Rounding Algorithms," STOC'02, May 19-21, 2002, Montreal, Quebec, Canada. pp. 380-388.

Chen, et al., "XGBoost: A Scalable Tree Boosting System," KDD '16, Aug. 13-17, 2016, San Francisco, CA, USA, pp. 785-794.

Chen, et al., "A Simple Framework for Contrastive Learning of Visual Representations," ICML, Vienna, Austria, vol. 119. 2020, pp. 1597-1607.

Deng, et al., "TURL: Table Understanding through Representation Learning," PVLDB vol. 14, No. 3 (2020), pp. 307-319.

Devlin, et al., "BERT: Pre-training of Deep Bidirectional Transformers for Language Understanding," Minneapolis, Minnesota, Jun. 2-Jun. 7, 2019. NAACL-HLT. pp. 4171-4186.

Dong, et al., "Efficient Joinable Table Discovery in Data Lakes: A High-Dimensional Similarity-Based Approach," ICDE. Mar. 29, 2021, pp. 456-467.

Fan, et al., "Semantics-aware Dataset Discovery from Data Lakes with Contextualized Column based Representation Learning," VLDB vol. 14, No. 1, Jan. 15, 2023, CoRR abs/2210.01922 (2022). https://doi.org/10.48550/ arXiv.2210.01922 (19 pages).

Farid, et al., "CLAMS: Bringing Quality to Data Lakes," SIGMOD Jun. 26-Jul. 1, 2016, San Francisco, CA USA, pp. 2089-2092.

Fernandez, et al., "Aurum: A Data Discovery System," 2018 IEEE 34th ICDE. pp. 1001-1012.

Fernandez, et al., "Seeping Semantics: Linking Datasets using Word Embeddings for Data Discovery," 2018 IEEE 34th ICDE. pp. 989-1000.

Galhotra et al., "Semantic Search over Structured Data," CIKM '20, Oct. 19-23, 2020, virtual Event, Ireland, pp. 3381-3384.

Gionis, et al., "Similarity Search in High Dimensions via Hashing," VLDB. Edinburgh, Scotland, 1999, pp. 518-529.

Harmouch, et al., "Relational Header Discovery using Similarity Search in a Table Corpus," 2021 IEEE 37th ICDE. pp. 444-455.

Hulsebos, et al., "Sherlock: A Deep Learning Approach to Semantic Data Type Detection," KDD '19, Aug. 4-8, 2019, Anchorage, AK, USA, pp. 1500-1508.

Iida, et al., "TABBIE: Pretrained Representations of Tabular Data," NAACL-HLT. Jun. 6-11, 2021. pp. 3446-3456.

Khatiwada, et al., "SANTOS: Relationship-based Semantic Table Union Search," SIGMOD, ACM Manag. Data, vol. 1, No. 1, Article 9. (May 2023), (25 pages).

Koutras, et al., "Valentine: Evaluating Matching Techniques for Dataset Discovery," 2021 IEEE 37th ICDE. pp. 468-479.

Lehmberg et al., "Stitching Web Tables for Improving Matching Quality," Proc. VLDB Endow. Vol. 10, No. 11 (2017), pp. 1502-1513.

Lehmberg, et al., "A Large Public Corpus of Web Tables containing Time and Context Metadata," WWW 16 Companion, Apr. 11-15, 2016, Montreal, Quebec, Canada. ACM, pp. 75-76.

Leventidis, et al., "DomainNet: Homograph Detection for Data Lake Disambiguation," 24th International Conference on EDBT. Mar. 23-26, 2021, pp. 13-24.

Li, et al., "Efficient Merging and Filtering Algorithms for Approximate String Searches," ICDE, University of California, Irvine, CA, USA. pp. 257-266.

Li, et al., "Deep Entity Matching with Pre-Trained Language Models," VLDB Endowment, vol. 14, No. 1, 2021, pp. 50-60.

Li, et al., "Deep Entity Matching: Challenges and Opportunities," Acm J. Data and Information Quality 13, 1, Article 1, Jan. 2021, (17pages).

Limaye, et al., "Annotating and Searching Web Tables Using Entities, Types and Relationships," Proc. VLDB Endowment, vol. 3, No. 1, Sep. 13-17, 2010, Singapore, pp. 1338-1347.

Ling, et al., "Synthesizing Union Tables from the Web," The 23rd IJCAI. pp. 2677-2683.

Liu, et al., "RoBERTa: A Robustly Optimized BERT Pretraining Approach," CoRR abs/1907.11692, Jul. 26, 2019 (13 pages).

Malkov et al., "Efficient and Robust Approximate Nearest Neighbor Search Using Hierarchical Navigable Small World Graphs," IEEE Trans. Pattern Anal. Mach. Intell. vol. 42, No. 4, Apr. 2020, pp. 824-836.

Manning, et al., "Introduction to information retrieval," Cambridge University Press, 2008.

Mazumdar et al., "Visualizing Semantic Table Annotations with TableMiner+," ISWC, vol. 1690, 2018, Sheffield, UK (4 pages).

Miller, et al., "Open Data Integration," Proc. VLDB Endow. vol. 11, No. 12 (2018), pp. 2130-2139.

Miller, et al., "Making Open Data Transparent: Data Discovery on Open Data," IEEE Data Eng. Bull. 41, 2 (2018), pp. 59-70.

Nargesian, et al., "Data Lake Management: Challenges and Opportunities," Proc. Endowment, vol. 12, No. 12 (2019), pp. 1986-1989.

Nargesian, et al., "Table Union Search on Open Data," Proc. VLDB Endow. vol. 11, No. 7 (2018), pp. 813-825.

Ota, et al., "Data-Driven Domain Discovery for Structured Datasets," Proc. VLDB Endow. vol. 13, No. 7 (2020), pp. 953-965.

Reimers et al., "Sentence-BERT: Sentence Embeddings using Siamese BERT-Networks," EMNLP. Association for Computational Linguistics, Hong Kong, China Nov. 3-7, 2019, p. 3982-3992.

Santos, et al., "A Sketch-based Index for Correlated Dataset Search," 2022 IEEE 38th ICDE. pp. 2928-2941.

Sarma, et al., "Finding Related Tables," SIGMOD '12, May 20-24, 2012, Scottsdale, Arizona, USA. pp. 817-828.

Suhara, et al., "Annotating cols. with Pre-trained Language Models," SIGMOD '22, Jun. 12-17, 2022, Philadelphia, PA, USA, pp. 1493-1503.

Vaswani, et al., "Attention Is All You Need," The 31st Conference on NeurIPS. Long Beach, CA, USA. pp. 5998-6008.

Venetis, et al., "Recovering Semantics of Tables on the Web," Proc. VLDB Endow. vol. 4, No. 9, Aug. 29-Sep. 3, 2011, Seattle, Washington, USA, pp. 528-538.

Wang, et al., "TCN: Table Convolutional Network for Web Table Interpretation," WWW '21, Apr. 19-23, 2021, Ljubljana, Slovenia. ACM, New York, NY, USA, pp. 4020-4032.

Wang, et al., "MF-Join: Efficient Fuzzy String Similarity Join with Multi-level Filtering," 2019 IEEE 35th ICDE. pp. 386-397.

Wolf, et al., "Transformers: State-of-the-Art Natural Language Processing," 2020 EMNLP. Nov. 16-20, 2020, pp. 38-45.

Wu, et al., "Scalable Metric Similarity Join using MapReduce," 2019 IEEE 35th ICDE. pp. 1662-1665.

Yakout, et al., "InfoGather: Entity Augmentation and Attribute Discovery by Holistic Matching with Web Tables," SIGMOD'12, May 20-24, 2012, Scottsdale, Arizona, USA. ACM, pp. 97-108.

Yin, et al., "TABERT: Pretraining for Joint Understanding of Textual and Tabular Data, " The 58th Annual Meeting of the ACL. Jul. 5-10, 2020. pp. 8413-8426.

Zhang, et al., "Sato: Contextual Semantic Type Detection in Tables," PVLDB vol. 13, No. 11, (2020), pp. 1835-1848.

Zhang, et al., "Finding Related Tables in Data Lakes for Interactive Data Science," SIGMOD'20, Jun. 14-19, 2020, Portland, OR, USA. pp. 1951-1966.

Zhang, et al., "Effective and Efficient Semantic Table Interpretation using TableMiner+," Semantic Web 8, 6 (2017), 921-957.

(56) References Cited

OTHER PUBLICATIONS

Zhao et al., "Leva: Boosting Machine Learning Performance with Relational Embedding Data Augmentation," SIGMOD'22, Jun. 12-17, 2022, Philadelphia, PA, USA, pp. 1504-1517.
Zhu, et al., "JOSIE: Overlap Set Similarity Search for Finding Joinable Tables in Data Lakes," SIGMOD '19, Jun. 30-Jul. 5, 2019, Amsterdam, Netherlands, pp. 847-864.
Zhu, et al., "LSH Ensemble: InternetScale Domain Search," Proc. VLDB Endow. vol. 9, No. 12 (2016), pp. 1185-1196.
Cong, Tianji et al. "Pylon: Semantic Table Union Search in Data Lakes." *ArXiv* abs/2301.04901 (2023): n. pag.

\* cited by examiner

300

```
┌─────────────────────────────────────────────────────────────────┐
│ DETERMINING COLUMN UNIONABILITY SCORES BETWEEN COLUMNS OF THE   │── 310
│ QUERY TABLE AND COLUMNS OF THE PLURALITY OF TABLES              │
└─────────────────────────────────────────────────────────────────┘
                                │
                                ▼
┌─────────────────────────────────────────────────────────────────┐
│ DETERMINING TABLE UNIONABILITY SCORES BETWEEN THE QUERY TABLES  │── 320
│ AND DATA REPOSITORY TABLES BASED ON THE COLUMN UNIONABILITY     │
│ SCORES                                                          │
└─────────────────────────────────────────────────────────────────┘
                                │
                                ▼
┌─────────────────────────────────────────────────────────────────┐
│ OUTPUTTING CANDIDATE TABLES FROM THE DATA REPOSITORY BASED ON   │── 330
│ THE TABLE UNIONABILITY SCORES                                   │
└─────────────────────────────────────────────────────────────────┘
```

*FIG. 3*

QUERY TABLE:

| STATE | OFFICE | DISTRICT | NAME | PARTY | RATING |
|---|---|---|---|---|---|
| AZ | U.S. HOUSE | 8 | TRENT FRANKS | REPUBLICAN | 95.0 |
| TX | U.S. HOUSE | 3 | SAM JOHNSON | REPUBLICAN | 95.0 |
| OH | U.S. HOUSE | 4 | JIM JORDAN | REPUBLICAN | 95.0 |

1010

CANDIDATE TABLE:

| NAME | PARTY | STATE | $ FROM INTEREST GROUPS THAT SUPPORTED | $ FROM INTEREST GROUPS THAT OPPOSED | VOTE |
|---|---|---|---|---|---|
| TRENT FRANKS | R | AZ-2 | $12,000 | $0 | YES |
| SAM JOHNSON | R | TX-3 | $4,000 | $0 | YES |
| JIM JORDAN | R | OH-4 | $22,000 | $0 | YES |

SYSTEMS AND METHODS FOR QUERYING LARGE DATA REPOSITORIES

BACKGROUND

Improving the ability of machine learning models to efficiently search and accurately identify relevant information in data repositories to allow computers to respond to queries is a challenging task. The task becomes increasingly difficult when the data repositories are large or at least partially unstructured or when unsupervised learning is applied. There is a need for techniques and systems that can understand relationships between various data within large data repositories to respond to the needs of modern queries for relevant information.

SUMMARY

Certain embodiments of the present disclosure relate to a non-transitory computer readable storage medium storing instructions that are executable by one or more processors to perform operations for dataset discovery. In some embodiments, the operations may include accessing a data repository comprising a plurality of tables having cell values arranged in one or more columns and one or more rows, generating serialized sequences of the cell values that correspond to particular columns of the plurality of tables, inputting the serialized sequences into a natural language model, converting, using the natural language model, the serialized sequences into contextualized embeddings associated with the plurality of tables, storing the contextualized embeddings associated with the plurality of tables in one or more vector indices, receiving a query table, or generating an output of one or more candidate tables from the plurality of tables having a unionability with the received query table. In some embodiments, generating an output of one or more candidate tables from the plurality of tables having a unionability with the received query table may include determining, using the one or more vector indices, one or more column unionability scores between columns of the query table and the one or more columns of the plurality of tables, determining, using the one or more column unionability scores, one or more table unionability scores between the query table and one or more of the plurality of tables, or outputting the one or more candidate tables based on the one or more table unionability scores.

According to some disclosed embodiments, each serialized sequence may include cell value tokens and separator tokens, wherein the separator tokens indicate a new column of additional cell value tokens. In some disclosed embodiments, converting of the serialized sequences into contextualized embeddings associated with the plurality of tables may be based on the cell value tokens and the separator tokens. In some disclosed embodiments, the one or more vector indices include at least one of a Locality Sensitivity Hashing (LSH) index or a Hierarchical Navigable Small World (HNSW) index. In some disclosed embodiments, the data repository may include unstructured or unlabeled data. In some disclosed embodiments, the data repository may be a data lake, data warehouse, data mart, object storage system, relational database, or nonrelational database. In some disclosed embodiments, the natural language model may comprise a multi-column encoder and the contextualized embeddings may include relationship data between the cell values within a first one of the one or more columns of the plurality of tables and the cell values within a second one of the one or more columns of the plurality of tables.

In some disclosed embodiments, converting of the serialized sequences into contextualized embeddings associated with the plurality of tables may include constructing a similarity graph over a plurality of the one or more columns of the plurality of tables, associating pairs of the one or more columns within the similarity graph having a cosine similarity above a threshold value, or generating, based on the associating, contextualized embeddings of the plurality of the one or more columns. In some disclosed embodiments, outputting of the one or more candidate tables may further be based on computed lower and upper bounds associated with the one or more table unionability scores. In some disclosed embodiments, the one or more column unionability scores between columns of the query table and the one or more columns of the plurality of tables may be based on a cosine similarity between query table embeddings and the contextualized embeddings. In some disclosed embodiments, the outputting of the one or more candidate tables may be based on a top-k highest table unionability score of the one or more table unionability scores.

In some disclosed embodiments, determining the one or more column unionability scores between columns of the query table and the one or more columns of the plurality of tables may include generating serialized sequences of query table cell values that correspond to particular columns within the query table, inputting the serialized sequences of query table cell values into the natural language model, converting, using the natural language model, the serialized sequences of query table cell values into contextualized embeddings associated with the query table, or generating the one or more column unionability scores based on a comparison of the contextualized embeddings associated with the query table and the contextualized embeddings associated with the plurality of tables. In some disclosed embodiments, the natural language model may be pre-trained using unsupervised contrastive learning based on the plurality of tables.

Certain embodiments of the present disclosure relate to a computer-implemented method for dataset discovery. The method may include accessing a data repository comprising a plurality of tables having cell values arranged in one or more columns and one or more rows, generating serialized sequences of the cell values that correspond to particular columns of the plurality of tables, inputting the serialized sequences into a natural language model, converting, using the natural language model, the serialized sequences into contextualized embeddings associated with the plurality of tables, storing the contextualized embeddings associated with the plurality of tables in one or more vector indices, receiving a query table, or generating an output of one or more candidate tables from the plurality of tables having a unionability with the received query table. In some embodiments, generating an output of one or more candidate tables from the plurality of tables having a unionability with the received query table may include determining, using the one or more vector indices, one or more column unionability scores between columns of the query table and the one or more columns of the plurality of tables, determining, using the one or more column unionability scores, one or more table unionability scores between the query table and one or more of the plurality of tables, or outputting the one or more candidate tables based on the one or more table unionability scores.

According to some disclosed embodiments, the natural language model may be pre-trained using unsupervised contrastive learning based on the one or more columns of the plurality of tables or the data repository may include unstructured or unlabeled data. In some disclosed embodiments, the natural language model may comprise a multi-column encoder and the contextualized embeddings may include relationship data between the cell values within a first one of the one or more columns of the plurality of tables and the cell values within a second one of the one or more columns of the plurality of tables.

Certain embodiments of the present disclosure relate to a dataset discovery system. The dataset discovery system may include one or more memory devices storing processor executable instructions, and one or more processors configured to execute the instructions to cause the dataset discovery system to perform operations. In some embodiments, the operations may include accessing a data repository comprising a plurality of tables having cell values arranged in one or more columns and one or more rows, generating serialized sequences of the cell values that correspond to particular columns of the plurality of tables, inputting the serialized sequences into a natural language model, converting, using the natural language model, the serialized sequences into contextualized embeddings associated with the plurality of tables, storing the contextualized embeddings associated with the plurality of tables in one or more vector indices, receiving a query table, or generating an output of one or more candidate tables from the plurality of tables having a unionability with the received query table. In some embodiments, generating an output of one or more candidate tables from the plurality of tables having a unionability with the received query table may include determining, using the one or more vector indices, one or more column unionability scores between columns of the query table and the one or more columns of the plurality of tables, determining, using the one or more column unionability scores, one or more table unionability scores between the query table and one or more of the plurality of tables, or outputting the one or more candidate tables based on the one or more table unionability scores.

According to some disclosed embodiments, the natural language model may be pre-trained using unsupervised contrastive learning based on the one or more columns of the plurality of tables. In some disclosed embodiments, the data repository may include unstructured or unlabeled data.

According to some disclosed embodiments, the natural language model may comprise a multi-column encoder and the contextualized embeddings may include relationship data between the cell values within a first one of the one or more columns of the plurality of tables and the cell values within a second one of the one or more columns of the plurality of tables.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 is a flowchart showing an exemplary method for generating an output of one or more candidate tables, consistent with embodiments of the present disclosure.

FIG. 10 illustrates an example output candidate table based on a received query table, consistent with embodiments of the present disclosure.

DETAILED DESCRIPTION

Figure 1:
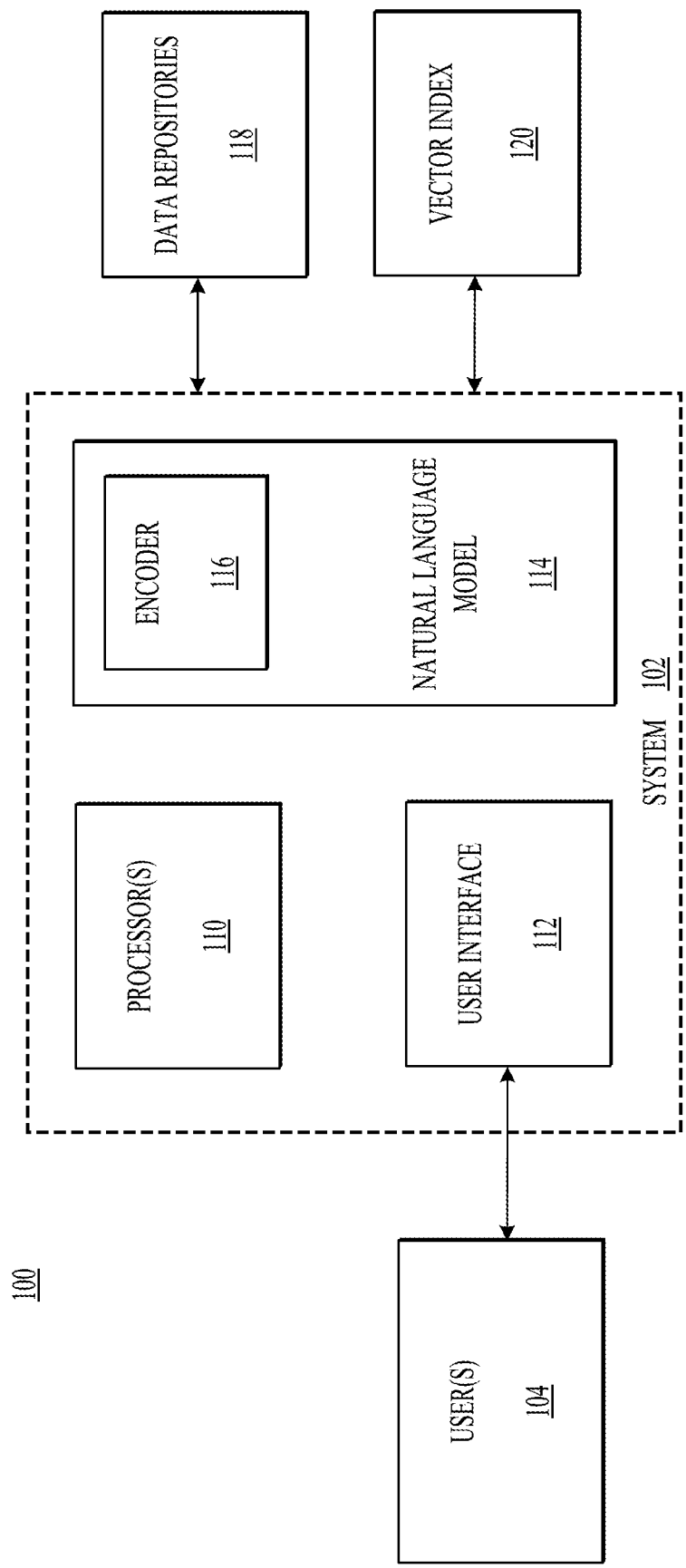
FIG. 1 is a block diagram showing exemplary components of a system for performing dataset discovery, consistent with embodiments of the present disclosure.

In the following detailed description, numerous details are set forth to provide a thorough understanding of the disclosed example embodiments. It is understood by those skilled in the art that the principles of the example embodiments may be practiced without every specific detail. The embodiments disclosed are exemplary and are not intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for evaluating data sources to identify unionable data for improving output and predictions provided by computing systems or machine learning models. These technologies and techniques can label and relate information available in large data repositories in an unsupervised manner and with greater effectiveness, thereby allowing for further utilization of the available information in large data repositories when determining similarities between query data and the vast amount of available, unlabeled, or unstructured information within such data repositories with greater efficiency and effectiveness.

These technologies and techniques can efficiently evaluate a query against large data sources and the information available therein to provide effective and accurate predictions based on the evaluation. The technologies and techniques allow for the application of natural language models to provide both syntactic and semantic relationships between data values within the available information. These technologies and techniques also allow for detailed evaluation of potentially every data value within a large data repository, which can improve a computing system's (or machine learning model's) decision making by generating and embedding both syntactic and semantic relationships between both the data values within a particular column (e.g., the relationship of data within a column) and the data values between various columns (e.g., the contextual relationship of one column to another column).

The described embodiments provide a distinct advantage over existing techniques for dataset discovery. Unlike most other processes, the systems and methods described in the disclosed embodiments may operate in an unsupervised manner on data that may be unstructured or unlabeled. Additionally, the described embodiments can provide useful insights even on large amounts of unstructured or unlabeled data that provides distinct advantages over current systems and methods that only work efficiently and effectively on small repositories of labeled data. By generating contextualized embeddings, which take into account the data within columns and the context of that data with relation to other columns, the embodiments disclosed herein can identify associations within the data of a given table on several levels. The ability to identify associations on several levels can provide significant advantages in the systems or machine learning models that must respond to various queries requesting matching information from a data repository. By allowing for unsupervised training and efficient identification of matching information, the embodiments disclosed herein can provide an improved ability to use machine learning in various industries and particularized contexts without the need for extensive modification or supervised training of a machine learning model.

FIG. 1 is a block diagram showing an exemplary operating environment 100 including a dataset discovery system 102, consistent with embodiments of the present disclosure. Dataset discovery system 102 may comprise one or more processors 110 (including a hardware accelerator that works alone or in tandem with a host processor), a user interface 112, and a natural language model 114 comprising an encoder 116. User interface 112 may refer to a software interface that allows users 104 to interact with system 102 or natural language model 114 by providing user inputs and receiving outputs from system 102 or natural language model 114. User interface 112 may enable users 104 to communicate a query (e.g., provide a query table) to system 102 and receive an output including data pulled from data repository 118 wherein the pulled data is related to and provided in response to the query. User interface 112 may include, e.g., a text-based interface, a voice-activated interface, a conversational interface, a command-line interface, a web interface, a virtual reality or augmented reality interface, a mobile application interface, or an email or text message interface. Natural language model 114 may refer to any artificial intelligence or machine learning model designed to understand, generate, or manipulate human language in a way that is similar to how humans use and comprehend language. Natural language model 114 may be built upon a foundation of machine learning techniques (e.g., deep learning and neural networks) and may be trained on large amounts of data to learn patterns, semantics, relationships, and context within and between the data. Encoder 116 may refer to a component or module within natural language model 114 that is responsible for converting input text or sequences into a numerical representation that may be processed by natural language model 114. Such numerical representations capture the semantic and contextual information of the input text or sequence data, allowing natural language model 114 to process the information in a meaningful manner before a decoding process which may, e.g., also be performed by encoder 116 to generate natural language output based on the numerical representations or further processing of information. Furthermore, natural language model 114 or encoder 116 may perform any one of the following processes: tokenization (e.g., splitting data into smaller units, such as words or sub-word tokens, and assigning each token a unique index, wherein the indices may be used as input to encoder 116), embedding (e.g., converting each unique index associated with a token into a high-dimensional vector representation that may be used to capture semantic information about the data and relationships between the data in the context of a given table or set of columns), or processing context (e.g., performing multiple layers of computations which allow natural language model 114 to weigh the importance of different tokens in relation to each other).

In some embodiments, system 102 or processor(s) 110 may access a data repository 118 (or at least one data repository) comprising a plurality of tables having cell values arranged in one or more columns and one or more rows. Data repository 118 may refer to a collection of data or information stored in one or more shared locations. Data repository 118 may be a managed storage space where data (e.g., a plurality of tables) is stored, managed, and made accessible to authorized users or applications. Data repository 118 may provide a reliable and secure way to store and retrieve data. In some embodiments, data repository 118 may include unstructured or unlabeled data. In some embodiments, data repository 118 may be a data lake, data warehouse, data mart, object storage system, relational database, or nonrelational database. In some embodiments, the data stored in data repository 118 may be normalized by system 102, processor(s) 110, or another component of system 102. Normalization may refer to a process of transforming data such that the data adheres to a specific format or standard, making it consistent and compatible with other data which may be input into a computing system. Normalization may involve transforming or structuring data so that it conforms to a predefined or widely accepted format or schema. Normalization may be performed, e.g., to achieve uniformity, interoperability, or consistency. For example, various dates in data repository may be listed in different formats (e.g., YYYY-MM-DD, MM/DD/YYYY, or "MONTH-DAY, YEAR"). Normalization of the various dates may involve transforming each date to a single format, such as, e.g., one of the examples provided above or another desired format.

In some embodiments, system 102, processor(s) 110, or another component of system 102 may generate serialized sequences of those cell values (or normalized cell values) that correspond to particular columns or rows of the plurality of tables within data repository 118. In some embodiments, each serialized sequence may include tokens corresponding to each cell value. In some embodiments, the tokens may include cell value tokens and separator tokens. Cell value tokens may refer to tokens associated with each cell within a column of the plurality of tables within data repository 118. Separator tokens may refer to tokens that indicate a separation between cell value tokens (e.g., a new column of a table). For example, the separator tokens may indicate an additional column containing additional cell data that is different from but related to a first set of cell value tokens (e.g., a first separator token may indicate a first column listing dates and a second separator token may indicate a second column listing names associated with the first column). Therefore, the generated serialized sequences may include sequences of cell value tokens separated by separator tokens to represent the cell value data listed in each column of a table in consecutive but separated sequences representing the cell value data in each column of a table in a single string.

In some embodiments, system 102 or processor(s) 110 may input the serialized sequences into a natural language model 114. In some embodiments, natural language model 114 or a component thereof (e.g., encoder 116) may be pre-trained using contrastive learning. In some embodiments, the contrastive learning may be fully unsupervised, which may eliminate reliance on supervised learning or the requirement for labeled training data which may be unavailable in a data repository (e.g., particularly large data repositories). Pre-training using contrastive learning may involve pre-training based on multiple columns of a training data set (e.g., data repository 118 or another set of training data tables). Pre-training using contrastive learning may further involve multi-column pre-training by generating multiple views of the same column, with the assumption that the multiple views preserve the semantic information of the original column and thus the multiple views contain related information. The contrastive learning may then bring the embeddings of the multiple views closer together in an embedding space, while pushing apart the embeddings of distinct columns (e.g., randomly selected columns from a plurality of tables) in the embedding space. The contrastive learning may, e.g., utilize a contrastive loss function. A contrastive loss function may, e.g., measure the distance between pairs of embeddings and penalize a model when the distance between similar pairs is too large or when the distance between dissimilar pairs is too small. By performing multi-column pre-training of a natural language model, the natural language model may be more efficiently trained to encode and embed column data of all tables of a data repository.

In some embodiments, system 102 or processor(s) 110 may convert, using, e.g., natural language model 114 (or encoder 116), the serialized sequences into contextualized embeddings associated with the plurality of tables. Contextualized embeddings may refer to representations (e.g., vector representations) which capture not only the meanings or formats of individual tokens within a column of a given table but also the meanings or formats of each individual token in context with other tokens associated with other columns of the given table. In some embodiments, the contextualized embeddings may also capture the overall structure or content of each table. For example, the contextualized embeddings generated by system 102 or processor(s) 110 may provide information regarding similarities or differences between cell values in a column of a given table as well as relationships between the cell values in that column and the cell values in another column of the given table. For instance, one column of a first table may list dates, while another column of the first table may list locations. Contextualized embeddings generated from the two columns of a table may capture that the dates listed in one column are related to a corresponding location listed in the other column (e.g., across a row of the given table). One column of a second table may also list dates, but another column of the second table may list names rather than locations. Contextualized embeddings generated from the two columns of the second table may capture that the dates listed in one column are related to a corresponding named entity listed in the other column (e.g., across a row of the other table). As a result, the contextualized embeddings generated from the first table based on the date column may be separated from the contextualized embeddings generated from the second table based on its date column even if the date information is the same (or at least formatted similarly) in both tables. Such separation may result from the captured context and relationships between the respective date information and the additional column data of each table (e.g., date associated with a location versus date associated with a named entity). Because the date information from the first table is associated with location data and the date information from the second table is associated with name data, any vector representing the date information from the first table may be embedded in a location separate from vectors representing the date information from the second table. Without such captured context and relationships, vectors representing the date information from the first table would be embedded, less accurately, in the same location as vectors representing the date information from the second table.

In some embodiments, encoder 116 may be a multi-column encoder. A multi-column encoder may refer to an encoder that is configured to evaluate a plurality of columns of one or more tables and encode the data within the columns to show both relationships between data within a column and relationships between data across multiple columns. In some embodiments, as a result of using the multi-column encoder, the generated contextualized embeddings may include relationship information between the cell values within a first one of the one or more columns of the plurality of tables and the cell values within a second one of the one or more columns of the plurality of tables of data repository 118. For example, the contextualized embeddings may capture that all of the cell values within a particular column of a table are dates and also that the cell values in another column of the same table are the names of individuals (e.g., the cell values may correspond to birthdays and named individuals, respectively). As a result, the contextualized embeddings may be generated to capture that each date is, e.g., a birthday, associated with an individual. As another example, the contextualized embeddings may capture that the cell values within a particular column of a table are dates and also that the cell values in another column of the same table are cities (e.g., the cell values may correspond to dates of foundation and particular cities, respectively). As a result, the generated contextualized embeddings may capture that each date is associated with a city. Taking both of the above examples into account, the contextualized embeddings from the table of the first example and the contextualized embeddings from the table of the second example would be oriented separately in an embedding space because of the context of each table (e.g., based on the different relationship between columns of each respective table), even though the date information in a first column of both tables may be the same (or at least formatted the same).

In some embodiments, converting of the serialized sequences into contextualized embeddings associated with the plurality of tables may include constructing a similarity graph (e.g., a bipartite graph) over a plurality of the one or more columns of the plurality of tables, associating pairs of the one or more columns within the similarity graph having a cosine similarity above a threshold value, or generating, based on the associating, contextualized embeddings of the plurality of the one or more columns. A cosine similarity between pairs of the one or more columns of the plurality of tables may indicate a relevance between columns or column data. For example, a cosine similarity may range from a value of −1 to a value of 1, and may be measured by the cosine of the angle between two vector representations projected in a multi-dimensional embedding space to determine whether the two vector representations are pointing in roughly the same direction. A threshold value may refer to a minimum predetermined cosine similarity value that is acceptable, based on the particular application, to indicate relevance between two vector representations.

In some embodiments, the conversion of the serialized sequences into contextualized embeddings associated with the plurality of tables may be based on the combination of cell value tokens and separator tokens of each serialized sequence. As discussed above, separator tokens may be utilized to indicate multiple columns in a sequence of cell value tokens. Based on the separator tokens, natural language model 114 or encoder 116 may understand both the tokens associated with a column of data and the tokens associated with other columns of that data. As a result, natural language model 114 or encoder 116 may generate embeddings which capture both the data in a particular column as well as the context of the data in the particular column with respect to other columns in the same table.

In some embodiments, system 102 or processor(s) 110 may store the contextualized embeddings associated with the plurality of tables in one or more vector indices 120. A vector index may refer to a data structure that enables fast and accurate search and retrieval of vector representations or embeddings from a data repository. In some embodiments, the one or more vector indices may include a linear index, a Locality Sensitive Hashing (LSH) index, or a Hierarchical Navigable Small World (HNSW) index. Storing the contextualized embeddings in a vector index such as LSH or HNSW may accelerate the processing of a query as compared to processing the same query using a linear index. Storing the contextualized embeddings in a HNSW index may further accelerate the processing of a query as compared to processing the same query using a LSH index. Processing a query may refer to generating contextualized embeddings for a query table and searching a vector index for unionable columns or tables based on the contextualized embeddings stored therein.

In some embodiments, system 102 or processor(s) 110 may receive a query (e.g., a query table) from a user 104 via user interface 112. For example, user 104 may input a query table comprising one or more columns of data to request system 102 to output tables from data repository 118 that are unionable with the query table.

In some embodiments, system 102 or processor(s) 110 may generate an output of one or more candidate tables from the plurality of tables within data repository 118 having a unionability with the received query table. Unionability may refer to a capability of merging two or more tables to effectively create a new table comprising data from at least one column of each of the two or more tables in a logical and comprehensible manner. For example, a table listing species of birds and attributes thereof may not be unionable with a table listing names of individuals and attributes thereof. However, a table listing names of individuals and birth dates corresponding to each listed individual may be unionable with a table listing the same names of individuals and current locations corresponding to each listed individual. In some embodiments, the generated output may include all tables from the plurality of tables in a data repository having a unionability with the received query table. In some embodiments, generating an output of one or more candidate tables may comprise determining (e.g., calculating), using the one or more vector indices or the contextualized embeddings stored therein, one or more column unionability scores between columns of the query table and the one or more columns of the plurality of tables. A column unionability score may refer to a value (e.g., a cosine similarity) indicating the possibility of merging one or more columns from each table to effectively create one or more new columns comprising data from each of the merged columns. In some embodiments, generating an output may further comprise determining (e.g., calculating), using the calculated column unionability scores, one or more table unionability scores between the query table and each of the plurality of tables. A table unionability score may refer to a value indicating the possibility of merging two or more tables to effectively create a new table comprising data from each of the two or more tables (e.g., by aggregating, averaging, or otherwise combining column unionability scores between the columns of each table). In some embodiments, generating an output may further comprise outputting the one or more candidate tables based on the one or more table unionability scores. For example, with reference to a query table, a first candidate table from data repository 118 may have a table unionability score of 0.8, while a second candidate table from data repository 118 may have a table unionability score of 0.9. As a result, the second candidate table may be output while the first candidate table may not be output. In some embodiments, system 102 may rank tables based on table unionability scores. For instance, using the above example, both tables may be included in the output, wherein the first candidate table is ranked lower than the second candidate table because of its lower table unionability score with the received query table.

In some embodiments, the outputting of the one or more candidate tables may further be based on (or aided by) computed lower and upper bounds associated with the one or more table unionability scores. For example, system 102 may calculate a lower bound and an upper bound associated with table unionability scores to verify calculated table unionability scores or to improve processing of a query table. When used for verifying, the upper and lower bounds may serve to define a range of acceptable table unionability scores between candidate tables and the query table. Table unionability score values that fall outside of the upper and lower bounds may be determined to be non-verified scores that may be discarded. And table unionability score values that fall within the upper and lower bounds may be determined to be verified scores that may be utilized for output. When used for improving processing of a query table, upper and lower bounds may help filter the relevant data available in a large data repository by defining a range of embedding values that are relevant and ignoring other embedding values that fall outside of the upper and lower bounds.

In some embodiments, the one or more column unionability scores between columns of the query table and the one or more columns of the plurality of tables may be calculated based on a cosine similarity between query table embeddings and the contextualized embeddings. Query table embeddings may refer to contextualized embeddings associated with a query table, as further discussed and exemplified below.

In some embodiments, the determining of the one or more column unionability scores between columns of the query table and the one or more columns of the plurality of tables may include generating serialized sequences of query table cell values that correspond to particular columns or rows within the query table, inputting the serialized sequences of query table cell values into the natural language model, converting, using, e.g., the natural language model, the serialized sequences of query table cell values into contextualized embeddings associated with the query table, or generating the one or more column unionability scores based on a comparison of the contextualized embeddings associated with the query table and the contextualized embeddings associated with the plurality of tables. Therefore, embeddings associated with the query table may be generated using a process similar to the process through which embeddings associated with the plurality of tables are generated.

In some embodiments, the outputting of the one or more candidate tables may be based on a top-k highest table unionability score of the one or more table unionability scores. A top-k highest table unionability score may refer to a predetermined number of top-ranked table unionability scores, where "k" may be any positive integer. For example, a top-5 highest table unionability score of the one or more table unionability scores may include the 5 highest table unionability scores calculated, and the output may thus include the 5 tables associated with those 5 table unionability scores. The output may further include rankings associated with each of the 5 output tables.

The components of dataset discovery system 102 can run on a single computer or may be distributed across multiple computers or processors. The different components of dataset discovery system 102 can communicate over a network (e.g., LAN or WAN) or the Internet. In some embodiments, each component can run on multiple computer instances or processors. The instances of each component of the dataset discovery system 102 can be a part of a connected network such as a cloud network (e.g., Amazon AWS, Microsoft Azure, Google Cloud). In some embodiments, some, or all, of the components of dataset discovery system 102 are executed in virtualized environments such as a hypervisor or a virtual machine.

Figure 2:
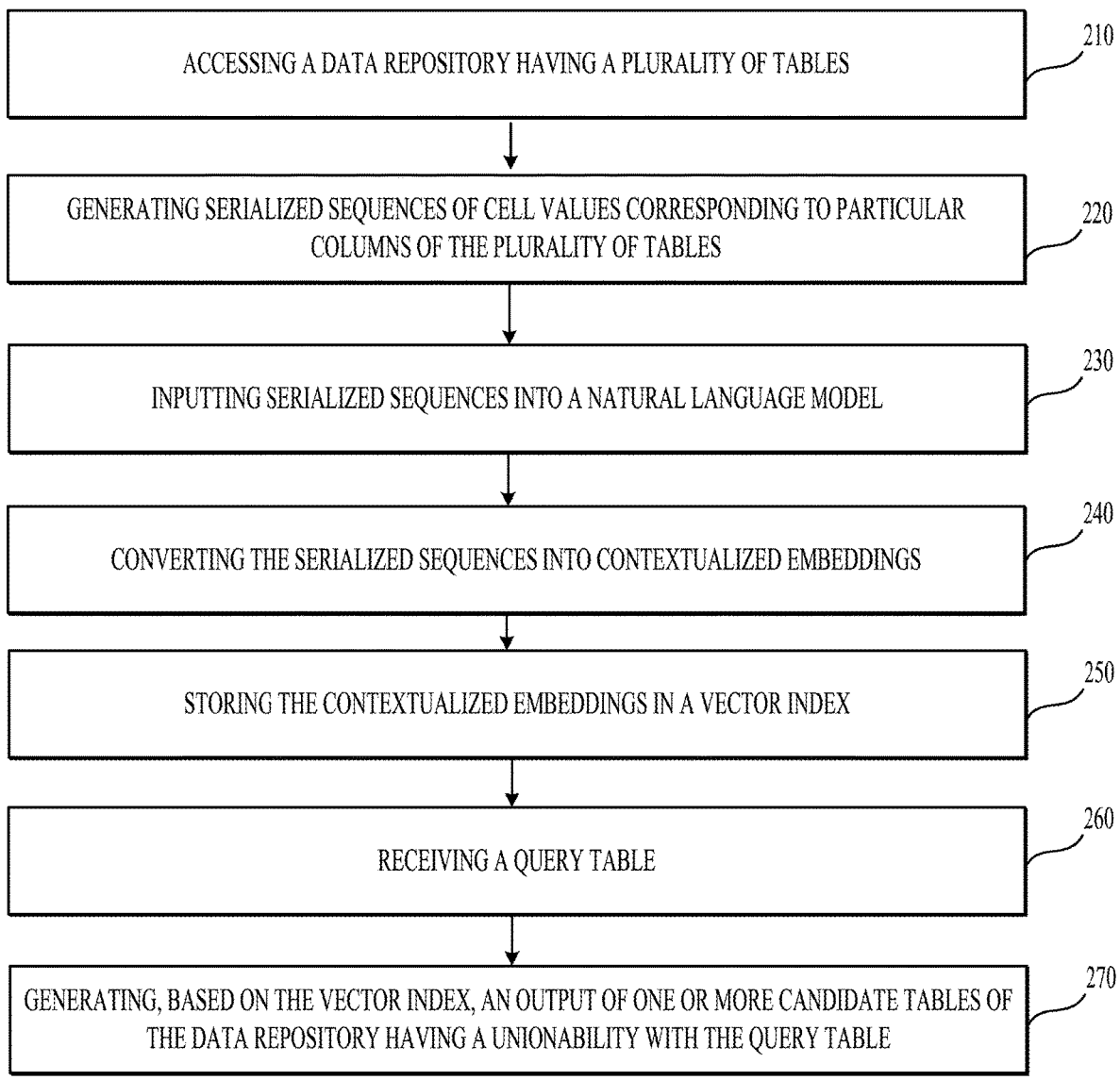
FIG. 2 is a flowchart showing an exemplary method for dataset discovery, consistent with embodiments of the present disclosure.

FIG. 2 is a flowchart showing an exemplary computer-implemented method 200 for dataset discovery, according to embodiments consistent with the present disclosure. The steps of method 200 may be performed by dataset discovery system 102 for purposes of illustration. It is appreciated that the illustrated method 200 is exemplary and steps may be added, merged, divided, duplicated, repeated (e.g., as part of a machine learning process), modified, performed sequentially, performed in parallel, or deleted in some embodiments.

In some embodiments, at step 210, method 200 may include accessing a data repository comprising a plurality of tables having cell values arranged in one or more columns and one or more rows.

In some embodiments, at step 220, method 200 may include generating serialized sequences of the cell values that correspond to particular columns of the plurality of tables, as described and exemplified elsewhere herein.

In some embodiments, at step 230, method 200 may include inputting the serialized sequences into a natural language model, as described and exemplified elsewhere herein.

In some embodiments, at step 240, method 200 may include converting, using the natural language model, the serialized sequences into contextualized embeddings associated with the plurality of tables, as described and exemplified elsewhere herein.

In some embodiments, at step 250, method 200 may include storing the contextualized embeddings associated with the plurality of tables in one or more vector indices, as described and exemplified elsewhere herein.

In some embodiments, at step 260, method 200 may include receiving a query table, as described and exemplified elsewhere herein.

In some embodiments, at step 270, method 200 may include generating an output of one or more candidate tables from the plurality of tables having a unionability with the received query table, as described and exemplified elsewhere herein. In some embodiments, generating an output may include determining, using the one or more vector indices, one or more column unionability scores between columns of the query table and the one or more columns of the plurality of tables, determining, using the one or more column unionability scores, one or more table unionability scores between the query table and one or more of the plurality of tables, or outputting the one or more candidate tables based on the one or more table unionability scores, as described and exemplified elsewhere herein.

FIG. 3 is a flowchart showing an exemplary method 300 for generating an output of one or more candidate tables, consistent with embodiments of the present disclosure. The steps of method 300 can be performed by dataset discovery system 102 for purposes of illustration. It is appreciated that the illustrated method 300 is exemplary and steps may be added, merged, divided, duplicated, repeated (e.g., as part of a machine learning process), modified, performed sequentially, performed in parallel, or deleted in some embodiments.

In some embodiments, at step 310, method 200 may include determining, using the one or more vector indices, one or more column unionability scores between columns of the query table and the one or more columns of the plurality of tables, as described and exemplified elsewhere herein.

In some embodiments, at step 320, method 200 may include determining, using the one or more column unionability scores, one or more table unionability scores between the query table and one or more of the plurality of tables, as described and exemplified elsewhere herein.

In some embodiments, at step 330, method 200 may include outputting the one or more candidate tables based on the one or more table unionability scores, as described and exemplified elsewhere herein.

Figure 4:
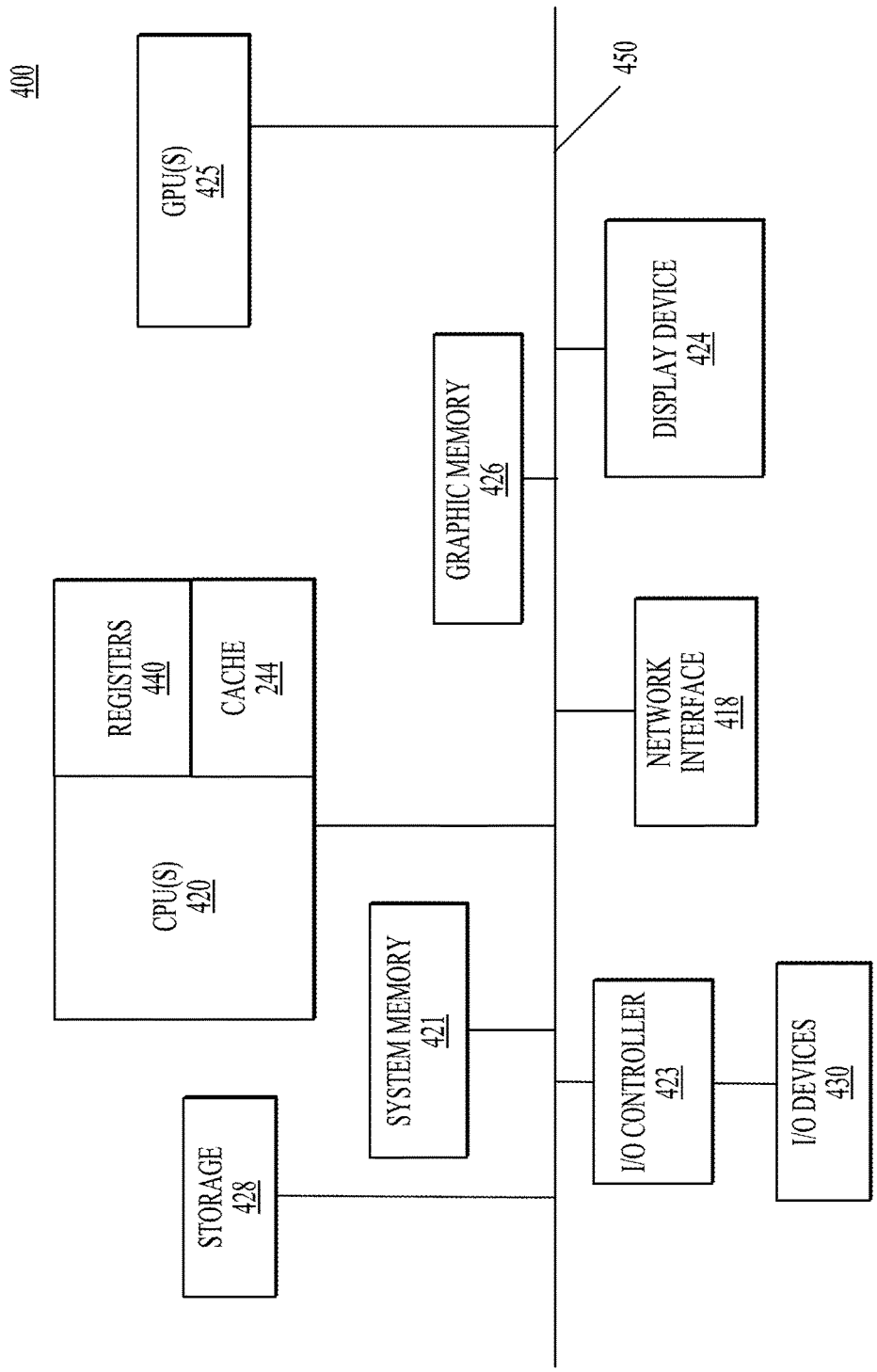
FIG. 4 is a block diagram of an exemplary computing device, consistent with embodiments of the present disclosure.

FIG. 4 is a block diagram of an exemplary computing device 400, consistent with embodiments of the present disclosure. In some embodiments, computing device 400 can be a specialized server providing the functionality described herein. In some embodiments, components of dataset discovery system 100, such as processor(s) 110, user interface 112, natural language model 114, or encoder 116 can be implemented using the computing device 400 or multiple computing devices 400 operating in parallel. Further, the computing device 400 can be a second device providing the functionality described herein or receiving information from a server to provide at least some of the described functionality. Moreover, the computing device 400 can be an additional device or devices that store or provide data consistent with embodiments of the present disclosure and, in some embodiments, computing device 400 can be a virtualized computing device such as a virtual machine, multiple virtual machines, or a hypervisor.

Computing device 400 can include one or more central processing units (CPUs) 420 and a system memory 421. Computing device 400 can also include one or more graphics processing units (GPUs) 425 and graphic memory 426. In some embodiments, computing device 400 can be a headless computing device that does not include GPU(s) 425 or graphic memory 426.

CPUs 420 can be single or multiple microprocessors, field-programmable gate arrays, or digital signal processors capable of executing sets of instructions stored in a memory (e.g., system memory 421), a cache (e.g., cache 441), or a register (e.g., one of registers 440). CPUs 420 can contain one or more registers (e.g., registers 440) for storing various types of data including, inter alia, data, instructions, floating-point values, conditional values, memory addresses for locations in memory (e.g., system memory 421 or graphic memory 426), pointers and counters. CPU registers 440 can include special-purpose registers used to store data associated with executing instructions such as an instruction pointer, an instruction counter, or a memory stack pointer. System memory 421 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 421 can be one or more memory chips capable of storing data and allowing direct access by CPUs 420. System memory 421 can be any type of random-access memory (RAM), or other available memory chip capable of operating as described herein.

CPUs 420 can communicate with system memory 421 via a system interface 450, sometimes referred to as a bus. In embodiments that include GPUs 425, GPUs 425 can be any type of specialized circuitry that can manipulate and alter memory (e.g., graphic memory 426) to provide or accelerate the creation of images. GPUs 425 can have a highly parallel structure optimized for processing large, parallel blocks of graphical data more efficiently than general-purpose CPUs 420. Furthermore, the functionality of GPUs 425 can be included in a chipset of a special purpose processing unit or a co-processor.

CPUs 420 can execute programming instructions stored in system memory 421 or other memory, operate on data stored in memory (e.g., system memory 421), and communicate with GPUs 425 through the system interface 450, which bridges communication between the various components of the computing device 400. In some embodiments, CPUs 420, GPUs 425, system interface 450, or any combination thereof, are integrated into a single chipset or processing unit. GPUs 425 can execute sets of instructions stored in memory (e.g., system memory 421), to manipulate graphical data stored in system memory 421 or graphic memory 426. For example, CPUs 420 can provide instructions to GPUs 425, and GPUs 425 can process the instructions to render graphics data stored in the graphic memory 426. Graphic memory 426 can be any memory space accessible by GPUs 425, including local memory, system memory, on-chip memories, and hard disk. GPUs 425 can enable displaying of graphical data stored in graphic memory 426 on display device 424 or can process graphical information and provide that information to connected devices through network interface 418 or I/O devices 430.

Computing device 400 can include a display device 424 and input/output (I/O) devices 430 (e.g., a keyboard, a mouse, or a pointing device) connected to I/O controller 423. I/O controller 423 can communicate with the other components of computing device 400 via system interface 450. It should now be appreciated that CPUs 420 can also communicate with system memory 421 and other devices in manners other than through system interface 450, such as through serial communication or direct point-to-point communication. Similarly, GPUs 425 can communicate with graphic memory 426 and other devices in ways other than system interface 450. In addition to receiving input, CPUs 420 can provide output via I/O devices 430 (e.g., through a printer, speakers, bone conduction, or other output devices).

Furthermore, the computing device 400 can include a network interface 418 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 418 can comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

Figure 5:
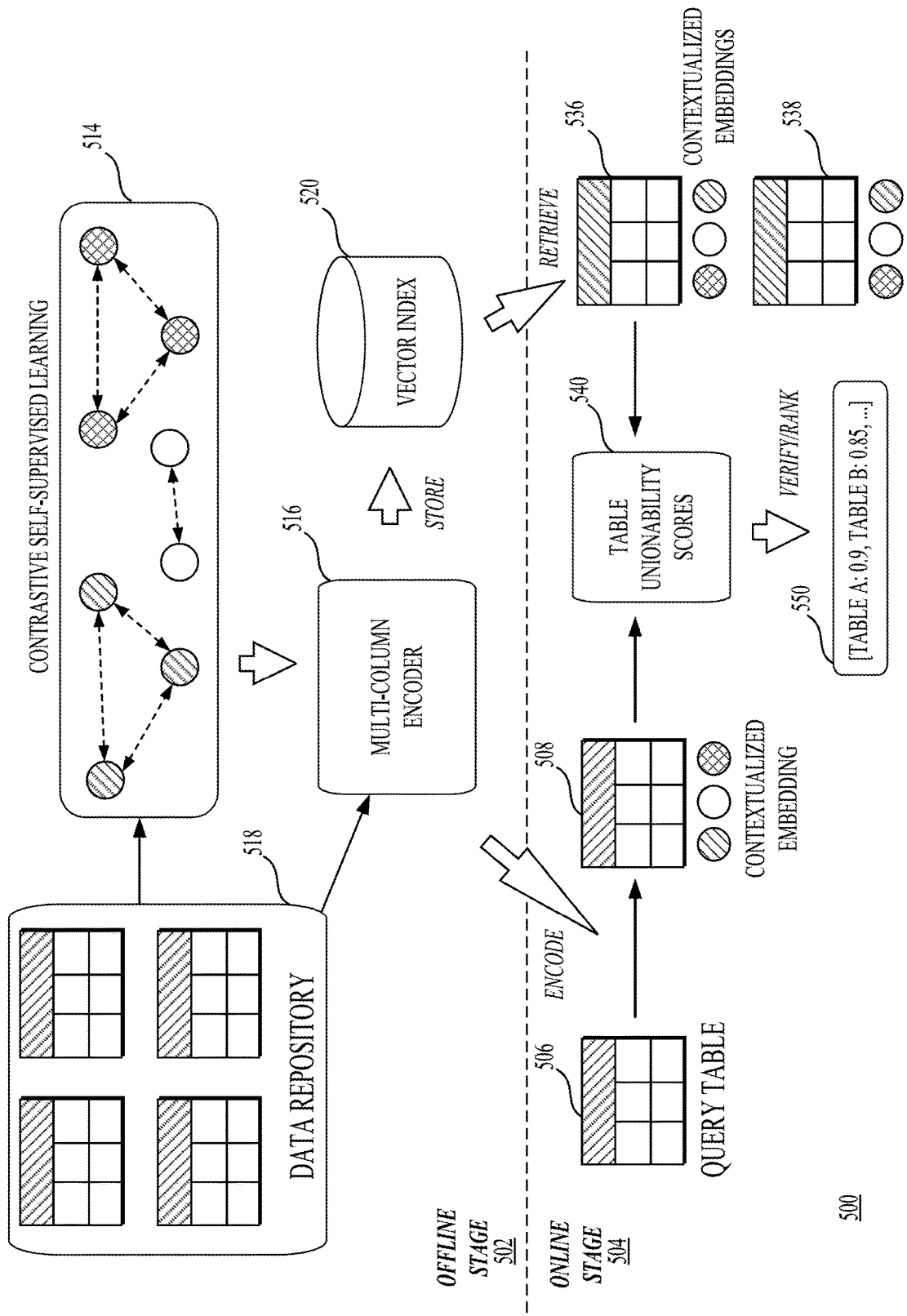
FIG. 5 is a diagram showing an exemplary process for dataset discovery, consistent with embodiments of the present disclosure.

FIG. 5 is a diagram showing an exemplary process 500 for dataset discovery, consistent with embodiments of the present disclosure. For purposes of illustration, the steps of method 500 can be performed by dataset discovery system 102 of FIG. 1 executing on or otherwise using the features of computing device 400 of FIG. 4. It is appreciated that the illustrated method 500 is exemplary and steps may be added, merged, divided, duplicated, repeated (e.g., as part of a machine learning process), modified, performed sequentially, performed in parallel, or deleted in some embodiments.

As illustrated in FIG. 5, method 500 may include an offline stage 502 and an online stage 504. During offline stage 502, a natural language model may be pre-trained using contrastive self-supervised learning 514. The contrastive self-supervised learning 514 may be applied to one or more training data tables or one or more tables of the plurality of tables in a data repository 518 (or multiple data repositories). In some embodiments, the natural language model may be pre-trained without supervision and without labeled training data (e.g., self-supervised contrastive learning 514). The pre-training of the natural language model is discussed in further detail below with regard to FIG. 6.

As further illustrated in FIG. 5, offline stage 502 may also include using an encoder (e.g., a multi-column encoder 516 of a machine learning model, e.g., the pre-trained natural language model) to generate contextualized embeddings 536, 538 associated with the plurality of tables available in data repository 518 (or in multiple data repositories). Based on the pre-training, the natural language model may be configured to receive, as input, cell value data associated with the data repository, and provide, as output, vector representations (e.g., contextualized embeddings 536, 538) of relationships of cell value data within columns of the plurality of tables in the data repository as well as relationships of cell value data between columns of the plurality of tables in the data repository. The generated vector representations thus form contextualized embeddings 536, 538 based on the combination of relationships of cell value data both within columns and between columns of the tables in data repository 518. The vector representations 536, 538 may be stored in one or more vector indices 520 (e.g., a linear index, LSH index, or HNSW index).

As further illustrated in FIG. 5, online stage 504 may include receiving a query table 506. Online stage 504 may further include generating contextualized embeddings 508 based on the cell value data within the query table 506. Generating contextualized embeddings 508 based on the cell value data within query table 506 may include steps similar to those discussed with relation to generating contextualized embeddings 536, 538 based on cell value data within data repository 518. Online stage 504 may also include accessing one or more vector indices 520 to retrieve and identify particular contextualized embeddings 536, 538 from the one or more vector indices 520 (e.g., those contextualized embeddings that are closer in orientation within the embedding space, and thus more relevant, to the contextualized embeddings 508 associated with the query table). Online stage 504 may further include generating an output of candidate tables from data repository 518, wherein the candidate tables have a unionability with the query table 506. Generating an output of candidate tables from the data repository may include determining one or more unionability scores using a scoring function. Unionability scores may be calculated between columns of tables (e.g., column unionability scores between columns of query table and columns of tables in the data repository). Unionability scores may also be calculated between tables (e.g., table unionability scores 540 between entire tables based on an aggregation of column unionability scores. Table unionability scores 540 may be calculated, e.g., using weighted bipartite graph matching. Furthermore, the output of candidate tables may be based on the table unionability scores between each candidate table and the query table. For example, a table having a higher table unionability score (e.g., a table unionability score above a threshold value) with a query table may be determined to be a candidate table while a table having a lower table unionability score (e.g., a table unionability score below the threshold value) may be determined to be a non-candidate table. As further illustrated in FIG. 5, the candidate tables may be verified to confirm that the cell value data of columns in each candidate table is related and thus unionable with the cell value data of columns in the query table. Verification may involve checking and ranking the candidate tables for the top-k tables having the highest table unionability scores with the query table (e.g., ranking the candidate tables via sequence 550).

Figure 6:
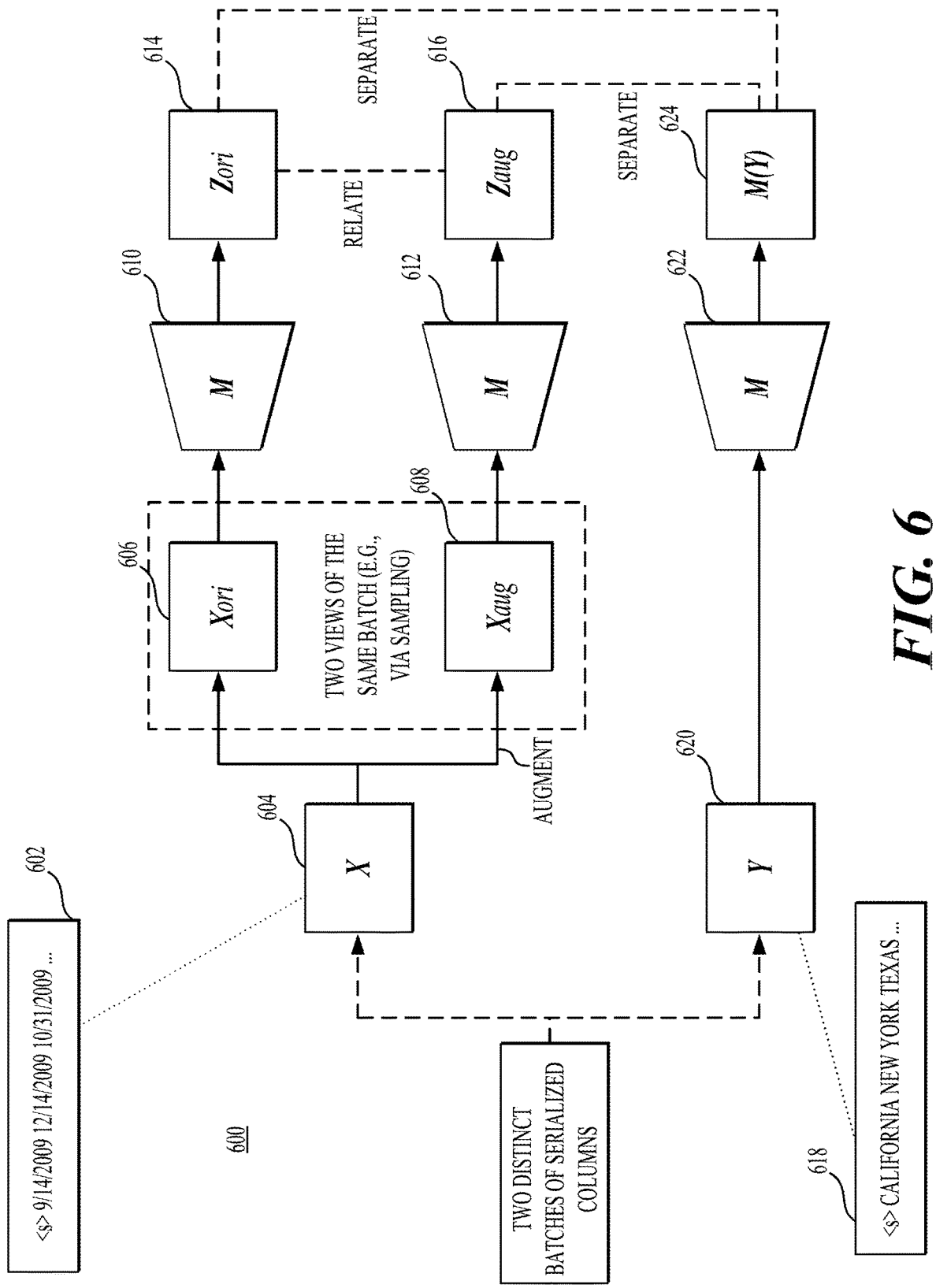
FIG. 6 is a diagram showing an exemplary process for contrastive learning, consistent with embodiments of the present disclosure.

FIG. 6 is a diagram showing an exemplary method 600 for self-supervised contrastive learning (e.g., contrastive pre-training). For purposes of illustration, the steps of method 600 can be performed by dataset discovery system 102 of FIG. 1 executing on or otherwise using the features of computing device 400 of FIG. 4. It is appreciated that the illustrated method 600 is exemplary and steps may be added, merged, divided, duplicated, repeated (e.g., as part of a machine learning process), modified, performed sequentially, performed in parallel, or deleted in some embodiments.

A natural language model may be pre-trained using contrastive learning techniques that may be applied to batches of serialized columns 602, 618 from training data tables or from tables in a data repository. As illustrated in FIG. 6, various columns from a table (e.g., a training data table or a table from the data repository) may be serialized. Serializing may refer to tokenizing cell value data within each column and ordering the serialized cell value data as presented in each column into a string. At least two batches of serialized column data 602, 618 may be generated from a given table. In some embodiments, it may be assumed that each individual batch of serialized column data contains unionable cell value data while different batches of serialized column data contain non-unionable call value data. Based on this assumption, a first batch 602 of serialized column data associated with a column of a table may be related to an augmented version of itself 608 and separated from a second batch 618 of serialized column data associated with a different column of the table (or a second batch of serialized column data associated with a randomly selected column of a different table). The relating and separating may result in the generation of vector representations 614, 616, 624 that indicate (e.g., by their proximity to one another within an embedding space) similarity or relevance between the cell value data of various columns. For example, as illustrated in FIG. 6, a first batch (X) 604 of serialized column data associated with one column of a table may be provided, and a second batch (Y) 620 of serialized column data associated with a column of another table may be provided. Based on the first batch (X) 604 of serialized column data, an augmented batch ($X_{aug}$) 608 of the serialized column data in the first batch (X) 606 may be generated (e.g., the same column data as that in $X_{ori}$ but serialized in a different order). Based on the assumption stated above, various presentations of data within the same batch of serialized columns may result in vector representations 614, 616 that are mapped closer because they contain similar cell value data (e.g., $Z_{ori}$ and $Z_{aug}$, which correlate to the same batch of serialized column data 602, all of which contain dates) while various representations of different batches of serialized columns may result in vector representations 614, 624 and 616, 624 that are mapped further away because they contain different cell value data (e.g., M (Y) 624, which correlates to a different batch of serialized column data indicating locations 618, as compared to batch of serialized column data 602 containing dates). Such mapping may be performed using any known mapping functions (e.g., mapping functions 610, 612, 622). It will be understood that mapping functions 610, 612, 622 may be the same mapping function or different mapping functions. The mapping function(s) may train a machine learning model (e.g., natural language model 114) to understand similarities and distinctions between data values found in the tables of a data repository. The trained machine learning model may then generate contextualized embeddings based on the full set of tables within a data repository, as further discussed below with relation to FIG. 8.

Figure 7:
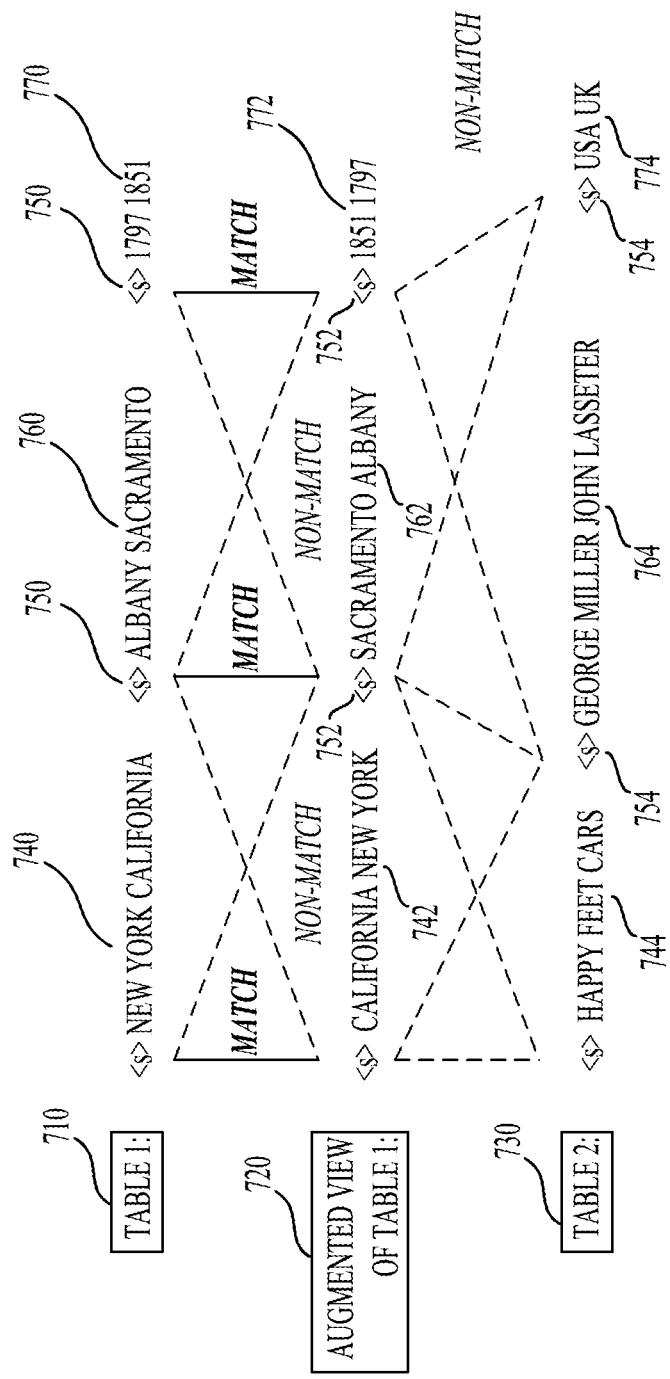
FIG. 7 illustrates exemplary batches of serialized column data used for contrastive learning, consistent with embodiments of the present disclosure.

FIG. 7 is an example of two batches of serialized column data that may be used for contrastive learning, consistent with disclosed embodiments. As illustrated in FIG. 7, a first batch of serialized column data may be generated from a first table 710, and a second batch of serialized column data may be generated from a second table 730. As also illustrated in FIG. 7, each batch of serialized column data includes separator tokens (<s>) 740 and cell value tokens 750. Separator tokens 740 indicate additional columns of a table, thereby allowing for a single serialized sequence of tokens to represent all columns of the table. As a result, the data of one column of a table may be associated with the data of other columns of the table to provide context for the data in each column of the table. As a further result, the data of columns of the first table 710 may be distinguished from the data of columns of the second table 730. As further illustrated in FIG. 7, the first batch of serialized column data may be augmented 720 to rearrange the order of tokens within each column of the first table. The augmented first batch of serialized column data may be understood (e.g., assumed) as a batch of serialized column data that matches the first batch of serialized column data. A natural language model may be trained to relate the cell value data associated with various cell value tokens or various separator tokens 750 of the first batch of serialized column data with the cell value data associated with various cell value tokens or separator tokens 752 of the augmented first batch of serialized column data, since the batches of data are associated with the same columns and the same table. For example, the natural language model may connect (e.g., relate, associate) cell value data associated with cell value tokens 740 with cell value data associated with cell value tokens 742. As another example, the natural language model may connect cell value data associated with cell value tokens 760 and cell value data associated with cell value tokens 762. As a further example, the natural language model may connect cell value data associated with cell value tokens 770 and cell value data associated with cell value tokens 772. A natural language may also be trained to distinguish (e.g., not connect, or separate) certain cell value data of the augmented first batch of serialized column data that does not match the first batch of serialized column data, e.g., based on the different columns within a table. For example, the natural language model may distinguish cell value data associated with cell value tokens 740 and cell value data associated with cell value tokens 762. As another example, the natural language model may distinguish cell value data associated with cell value tokens 760 and cell value data associated with cell value tokens 742. As a further example, the natural language model may distinguish cell value data associated with cell value tokens 740 and cell value data associated with cell value tokens 772. A natural language model may further be trained to distinguish the cell value data associated with various cell value tokens and various separator tokens 750 of the first batch of serialized column data and the cell value data associated with various cell value tokens and various separator tokens 754 of the second batch of serialized column data, since the batches of data are associated with distinct columns or tables that do not match. For example, the natural language model may distinguish (e.g., not connect, or separate) cell value data associated with cell value tokens 740 and cell value data associated with any one of cell value tokens 744, 764, 774. As another example, the natural language model may distinguish cell value data associated with cell value tokens 760 and cell value data associated with any one of cell value tokens 744, 764, 774. As a further example, the natural language model may distinguish cell value data associated with cell value tokens 770 and cell value data associated with any one of cell value tokens 744, 764, 774. The same process may be performed with respect to additional columns or tables to further train the natural language model in an unsupervised manner and regardless of whether the additional columns or tables contain labeled or structured data.

Figure 8:
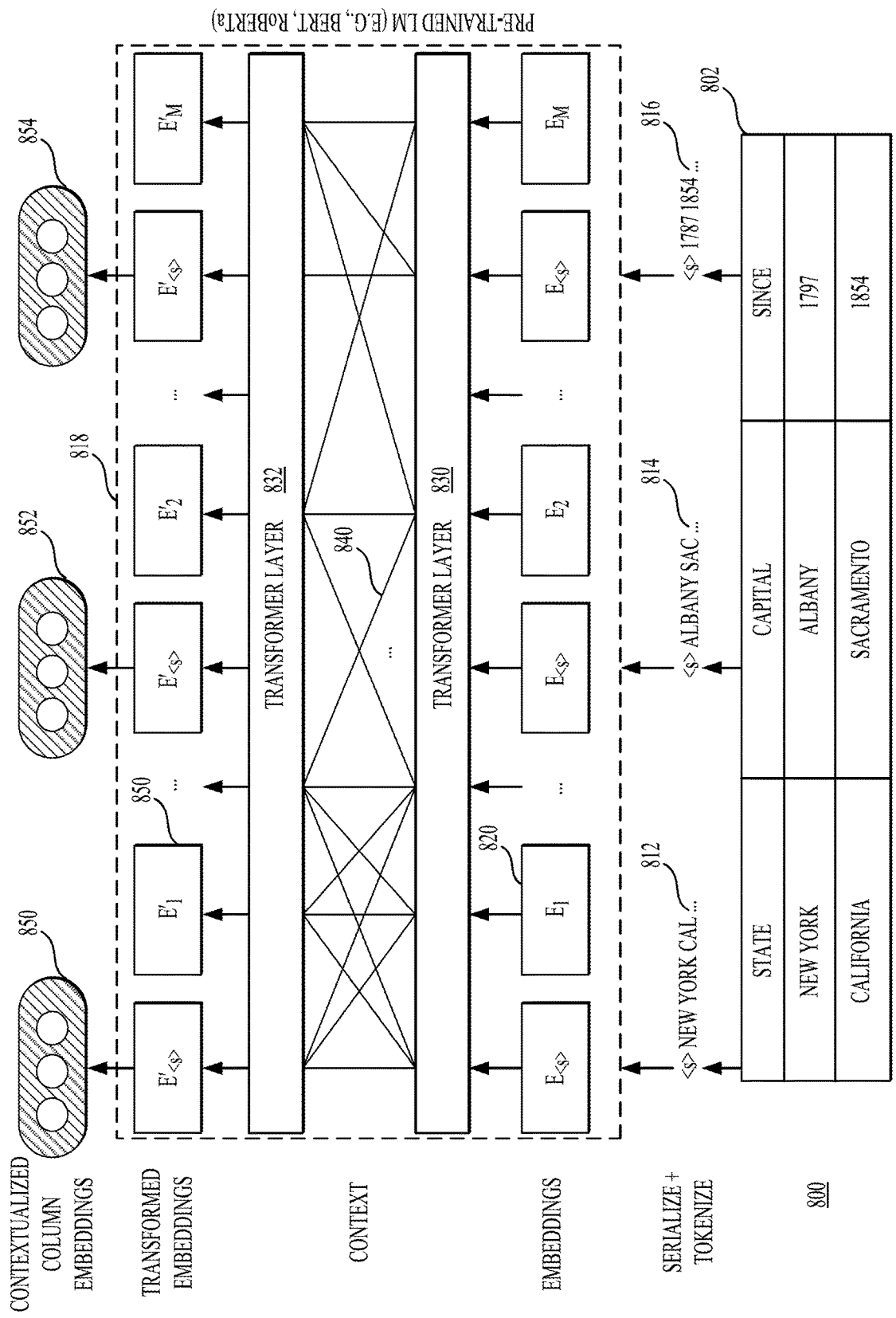
FIG. 8 illustrates an exemplary process for generating contextualized embeddings from the data found within tables of a data repository, consistent with embodiments of the present disclosure.

FIG. 8 is a diagram showing an exemplary method 800 for generating contextualized embeddings from the data found within tables of a data repository. For purposes of illustration, the steps of method 800 can be performed by dataset discovery system 102 of FIG. 1 executing on or otherwise using the features of computing device 400 of FIG. 4. It is appreciated that the illustrated method 800 is exemplary and steps may be added, merged, divided, duplicated, repeated (e.g., as part of a machine learning process), modified, performed sequentially, performed in parallel, or deleted in some embodiments.

As illustrated in FIG. 8, cell data values within various columns of an input table 802 may be serialized (and tokenized) to form serialized sequences 812, 814, 816 of cell data values associated with each column of input table 802. The serialized sequences 812, 814, 816 of cell data values may be input into a pre-trained natural language model 818 (e.g., BERT, ROBERTa). Pre-trained natural language model 818 may first generate a set of embeddings 820 (e.g., vector representations) based directly on the individual serialized sequences of cell data values and then transform the set of embeddings 820 based on relationship data 840 between different serialized sequences of cell data values (e.g., using one or more transformer layers 830, 832 which take into account the context (e.g., relationship data 840) between columns of the input table). The transformed set of embeddings 850 thereby reflects both syntactic and semantic associations between data within each column of cells of input table 802 as well as semantic associations between cell data values across columns (e.g., cell data values within a row) of input table 802. Based on the transformed set of embeddings 850, pre-trained natural language model 818 may output (e.g., generate) contextualized column embeddings 850, 852, 854 which represent relationships of data in the cells of input table 802, both within columns of input table 802 and between columns of input table 802. The same process may be repeated for each table found within a data repository to generate a mapping of contextualized column embeddings associated with the data repository.

Figure 9:
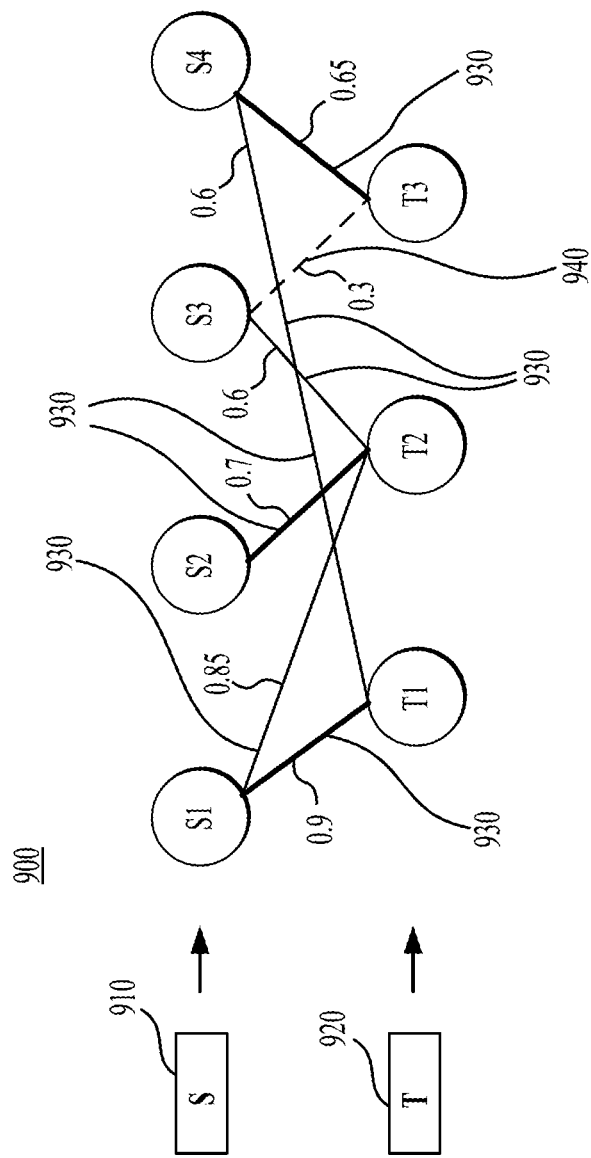
FIG. 9 illustrates an exemplary process for determining table unionability scores, consistent with embodiments of the present disclosure.

FIG. 9 shows an exemplary process 900 for determining a table unionability score based on column unionability scores. As illustrated in FIG. 9, a query table, S, 910 may have 4 columns, S1, S2, S3, and S4, and a candidate table, T, 920 may have 3 columns, T1, T2, and T3. Column unionability scores 930 may be calculated between each column of query table, S, 910 and each column of candidate table, T 920. A table unionability score between tables S and T may be calculated based on an aggregation or averaging of the column unionability scores 930 across all columns of each table. In some embodiments, a column unionability score below a threshold value, such as, e.g., column unionability score 940, may be disregarded when determining a table unionability score. For example, if no columns between tables S and T have a column unionability score above a threshold value, table T may be determined to have a table unionability score of zero (or non-zero but below a threshold value) and thus to be non-unionable with table S. If only a single pair of columns between tables S and T have a column unionability score above a threshold value, table T may be determined as unionable with table S, but the table unionability score may be below another threshold value associated with table unionability scores required for a determination of relevant unionability with table S. If several pairs of columns between tables S and T have a column unionability score above a threshold value, table T may be determined as unionable with table S, and the table unionability score may meet or surpass the threshold value required for a determination of unionability with table S. Thus, the table unionability score between two tables may take into account the relationships between several columns of each table, wherein a greater number of relationships or greater strengths of those relationships result in a higher table unionability score. This process may be repeated for various tables in a data repository to determine the top candidate tables that are unionable with a query table.

FIG. 10 shows an exemplary output candidate table 1020 based on a received query table 1010. The candidate table 1020 contains several columns that contain data that is similar to that of the query table 1010, and thus the table unionability score between the candidate table 1020 and the query table 1010 may be higher than the table unionability score between other tables and the query table 1010. This is evident, e.g., based not only on the similar "name" column data of each table 1010, 1020 but also on the similarities between the data listed in the "party" and "state" columns of each table 1010, 1020. For example, a data repository may also contain tables having the same list of states in one column but irrelevant information in other columns. Such tables would have lower column unionability scores and thus a lower table unionability score with the query table 1010 because the data in the other columns (e.g., the context) is not relatable. In contrast, the candidate table 1020 shares relatable data across three columns with the query table 1010, which leads to several high column unionability scores and thus a higher table unionability score with the query table 1010. As a result, the candidate table 1020 shown may be output while other tables from the data repository may not be output (or may be output but with a lower ranking).

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by one or more processors to cause the one or more processors to perform operations for dataset discovery, the operations comprising:

accessing a data repository comprising a plurality of tables having cell values arranged in one or more columns and one or more rows;

generating serialized sequences of the cell values that correspond to particular columns of the plurality of tables;

inputting the serialized sequences into a natural language model;

converting, using the natural language model, the serialized sequences into contextualized embeddings associated with the plurality of tables;

storing the contextualized embeddings associated with the plurality of tables in one or more vector indices;

receiving a query table; and generating an output of one or more candidate tables from the plurality of tables having a unionability with the received query table, by:

determining, using the one or more vector indices, one or more column unionability scores between columns of the query table and the one or more columns of the plurality of tables;

determining, using the one or more column unionability scores, one or more table unionability scores between the query table and one or more of the plurality of tables; and outputting the one or more candidate tables based on the one or more table unionability scores.

2. The non-transitory computer readable storage medium of claim 1, wherein each serialized sequence includes cell value tokens and separator tokens, wherein the separator tokens indicate a new column of additional cell value tokens.

3. The non-transitory computer readable storage medium of claim 2, wherein converting of the serialized sequences into contextualized embeddings associated with the plurality of tables is based on the cell value tokens and the separator tokens.

4. The non-transitory computer readable storage medium of claim 1, wherein the one or more vector indices include at least one of a Locality Sensitivity Hashing (LSH) index or a Hierarchical Navigable Small World (HNSW) index.

5. The non-transitory computer readable storage medium of claim 1, wherein the data repository includes unstructured or unlabeled data.

6. The non-transitory computer readable storage medium of claim 1, wherein the data repository is a data lake, data warehouse, data mart, object storage system, relational database, or nonrelational database.

7. The non-transitory computer readable storage medium of claim 1, wherein the natural language model comprises a multi-column encoder and the contextualized embeddings include relationship data between the cell values within a first one of the one or more columns of the plurality of tables and the cell values within a second one of the one or more columns of the plurality of tables.

8. The non-transitory computer readable storage medium of claim 1, wherein determining the one or more column unionability scores further comprises:

constructing a similarity graph over a plurality of the one or more columns of the plurality of tables; and associating pairs of the one or more columns within the similarity graph having a cosine similarity above a threshold value.

9. The non-transitory computer readable storage medium of claim 1, wherein outputting of the one or more candidate tables is further based on computed lower and upper bounds associated with the one or more table unionability scores.

10. The non-transitory computer readable storage medium of claim 1, wherein the one or more column unionability scores between columns of the query table and the one or more columns of the plurality of tables are determined based on a cosine similarity between query table embeddings and the contextualized embeddings.

11. The non-transitory computer readable storage medium of claim 1, wherein outputting of the one or more candidate tables is based on a top-k highest table unionability score of the one or more table unionability scores.

12. The non-transitory computer readable storage medium of claim 1, wherein determining the one or more column unionability scores between columns of the query table and the one or more columns of the plurality of tables includes:

generating serialized sequences of query table cell values that correspond to particular columns within the query table;

inputting the serialized sequences of query table cell values into the natural language model;

converting, using the natural language model, the serialized sequences of query table cell values into contextualized embeddings associated with the query table; and generating the one or more column unionability scores based on a comparison of the contextualized embeddings associated with the query table and the contextualized embeddings associated with the plurality of tables.

13. The non-transitory computer readable storage medium of claim 1, wherein the natural language model is pre-trained using unsupervised contrastive learning based on the plurality of tables.

14. A computer-implemented method for dataset discovery, the method comprising:

accessing a data repository comprising a plurality of tables having cell values arranged in one or more columns and one or more rows;

generating serialized sequences of the cell values that correspond to particular columns of the plurality of tables;

inputting the serialized sequences into a natural language model;

converting, using the natural language model, the serialized sequences into contextualized embeddings associated with the plurality of tables;

storing the contextualized embeddings associated with the plurality of tables in one or more vector indices;

receiving a query table; and generating an output of one or more candidate tables from the plurality of tables having a unionability with the received query table, by:

determining, using the one or more vector indices, one or more column unionability scores between columns of the query table and the one or more columns of the plurality of tables;

determining, using the one or more column unionability scores, one or more table unionability scores between the query table and one or more of the plurality of tables; and outputting the one or more candidate tables based on the one or more table unionability scores.

15. The method of claim 14, wherein:

the natural language model is pre-trained using unsupervised contrastive learning based on the one or more columns of the plurality of tables; and the data repository includes unstructured or unlabeled data.

16. The method of claim 14, wherein the natural language model comprises a multi-column encoder and the contextualized embeddings include relationship data between the cell values within a first one of the one or more columns of the plurality of tables and the cell values within a second one of the one or more columns of the plurality of tables.

17. A dataset discovery system, comprising:
one or more memory devices storing processor executable instructions; and
one or more processors configured to execute the instructions to cause the dataset discovery system to perform operations comprising:
  accessing a data repository comprising a plurality of tables having cell values arranged in one or more columns and one or more rows;
  generating serialized sequences of the cell values that correspond to particular columns of the plurality of tables;
  inputting the serialized sequences into a natural language model;
  converting, using the natural language model, the serialized sequences into contextualized embeddings associated with the plurality of tables;
  storing the contextualized embeddings associated with the plurality of tables in one or more vector indices;
  receiving a query table; and
  generating an output of one or more candidate tables from the plurality of tables having a unionability with the received query table, by:
    determining, using the one or more vector indices, one or more column unionability scores between columns of the query table and the one or more columns of the plurality of tables;
    determining, using the one or more column unionability scores, one or more table unionability scores between the query table and one or more of the plurality of tables; and
    outputting the one or more candidate tables based on the one or more table unionability scores.

18. The system of claim 17, wherein the natural language model is pre-trained using unsupervised contrastive learning based on the one or more columns of the plurality of tables.

19. The system of claim 18, wherein the data repository includes unstructured or unlabeled data.

20. The system of claim 17, wherein the natural language model comprises a multi-column encoder and the contextualized embeddings include relationship data between the cell values within a first one of the one or more columns of the plurality of tables and the cell values within a second one of the one or more columns of the plurality of tables.

* * * * *